US012592040B2

(12) United States Patent
Kim

(10) Patent No.: US 12,592,040 B2
(45) Date of Patent: Mar. 31, 2026

(54) METHOD AND APPARATUS FOR METAVERSE PERFORMANCE AUTHORING SYSTEM

(71) Applicant: ELECTRONICS AND TELECOMMUNICATIONS RESEARCH INSTITUTE, Daejeon (KR)

(72) Inventor: Hae Dong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 188 days.

(21) Appl. No.: 18/451,573

(22) Filed: Aug. 17, 2023

(65) Prior Publication Data

US 2024/0212276 A1 Jun. 27, 2024

(30) Foreign Application Priority Data

Dec. 23, 2022 (KR) ........................ 10-2022-0183123

(51) Int. Cl.
G06T 17/10 (2006.01)
G06T 15/04 (2011.01)
H04L 9/00 (2022.01)

(52) U.S. Cl.
CPC .............. *G06T 17/10* (2013.01); *G06T 15/04* (2013.01); *H04L 9/50* (2022.05)

(58) Field of Classification Search
CPC ....... G06T 17/10; G06T 17/005; G06T 17/05; G06T 17/20; G06T 15/04; G06T 15/10; G06T 19/006; G06T 19/20; H04L 9/50; G06Q 50/10
See application file for complete search history.

(56) References Cited

U.S. PATENT DOCUMENTS

| | | | |
|---|---|---|---|
| 9,480,928 B2 | 11/2016 | Park et al. | |
| 12,026,846 B2 * | 7/2024 | Lai ..................... | G06Q 30/0207 |
| 12,190,455 B2 * | 1/2025 | Freiwirth ................ | G06F 3/011 |
| 2016/0308873 A1 | 10/2016 | Noh | |
| 2022/0392175 A1 * | 12/2022 | Freiwirth ............ | H04L 65/1093 |

(Continued)

FOREIGN PATENT DOCUMENTS

| | | |
|---|---|---|
| KR | 10-2009-0016234 A | 2/2009 |
| KR | 10-2013-0131179 A | 12/2013 |
| KR | 10-2020-0138096 A | 12/2020 |

(Continued)

*Primary Examiner* — Vijay Shankar
(74) *Attorney, Agent, or Firm* — NSIP Law

(57) ABSTRACT

The present disclosure relates to a method and apparatus for a metaverse performance contents authoring system. A method according to an embodiment of the present disclosure may comprise generating one or more assets related to performance authoring on a metaverse-based platform; and registering the generated one or more assets in a management server linked with the metaverse-based performance authoring system. The one or more assets may be shared on the metaverse-based platform and applied to the performance authoring. The one or more assets may include at least one of the following assets. The following assets include performance prop assets related to objects, performance effect assets related to special effects, or performance environment assets related to an overall configuration used in a performance.

20 Claims, 10 Drawing Sheets

(56) References Cited

U.S. PATENT DOCUMENTS

2023/0137613 A1* 5/2023 Lai ..................... G06Q 30/0207
345/419
2023/0267670 A1* 8/2023 Kim ......................... G06T 7/20
345/474

FOREIGN PATENT DOCUMENTS

| KR | 10-2368953 | B1 | 3/2022 |
| KR | 10-2376390 | B1 | 3/2022 |
| KR | 10-2022-0067088 | A | 5/2022 |
| KR | 10-2022-0069379 | A | 5/2022 |
| KR | 10-2022-0113908 | A | 8/2022 |
| KR | 10-2022-0146298 | A | 11/2022 |

* cited by examiner

FIG.4

METHOD AND APPARATUS FOR METAVERSE PERFORMANCE AUTHORING SYSTEM

CROSS-REFERENCE TO RELATED APPLICATIONS

This application claims the benefit of earlier filing date and right of priority to Korean Application No. 10-2022-0183123, filed on Dec. 23, 2022, the contents of which are all hereby incorporated by reference herein in their entirety.

TECHNICAL FIELD

The present disclosure relates to the field of virtual reality performance authoring technology linked with a metaverse platform, and specifically, to a method and apparatus for efficiently managing and sharing performance works based on a metaverse scheme.

BACKGROUND

Performance technology will be classified into real world-based performance technology performed in the real world, mixed/augmented reality-based performance technology combined with eXtended Reality (XR) technology, and/or virtual performance technology expressed in the virtual world.

SUMMARY

A technical object of the present disclosure is to provide a method and apparatus for efficiently producing virtual performance contents using a shared performance work linked with the metaverse platform.

A technical object of the present disclosure is to provide a method and apparatus for registering and utilizing a shared performance work provided on a metaverse.

The technical objects to be achieved by the present disclosure are not limited to the above-described technical objects, and other technical objects which are not described herein will be clearly understood by those skilled in the pertinent art from the following description.

The method performed by a metaverse-based performance authoring system according to one aspect of the present disclosure may comprise: generating one or more assets related to performance authoring on a metaverse-based platform; and registering the generated one or more assets in a management server linked with the metaverse-based performance authoring system. The one or more assets may be shared on the metaverse-based platform and applied to the performance authoring. Additionally, the one or more assets may include at least one of a performance prop asset related to a prop of a performance, a performance effect asset related to special effects of a performance, or a performance environment asset related to an overall configuration of a performance.

An apparatus for a metaverse-based performance authoring system according to another aspect of the present disclosure may comprise a processor, a transceiver and a memory, and the processor may comprise one or more modules for performance authoring on a metaverse-based platform. The one or more modules may be configured to: generate one or more assets related to performance authoring on a metaverse-based platform; and register the generated one or more assets in a management server linked with the metaverse-based performance authoring system. The one or more assets may be shared on the metaverse-based platform and applied to the performance authoring. Additionally, the one or more assets may include at least one of a performance prop asset related to a prop of a performance, a performance effect asset related to special effects of a performance, or a performance environment asset related to an overall configuration of a performance.

In various aspects of the present disclosure, the performance prop asset may be generated based on a first component for a geometric shape of an object, a second component for a material of an object, and a third component for a texture of an object. Additionally, the performance prop asset may be generated by applying one of pre-configured operation modes for the first component, one of a pre-configured second list of alternatives for the second component and one of a pre-configured third list of alternatives for the third component.

In various aspects of the present disclosure, the performance effect asset may be generated by applying a specific performance effect according to a start or end event for a pre-configured performance effect and a pre-configured alternative property setting event.

In various aspects of the present disclosure, the performance environment asset may be generated by applying a specific scenario according to a performance environment configuration for a pre-configured performance scenario and a pre-configured alternative scenario setting event. Additionally, the performance environment configuration may include a configuration of arranging an object corresponding to the performance prop asset and an object corresponding to the performance effect asset in a metaverse-based specific performance venue.

In various aspects of the present disclosure, the one or more assets may be managed based on pre-configured protection information, and the pre-configured protection information may have asset identification information and author information as a basic configuration, and include asset property information or sharing range information.

In various aspects of the present disclosure, the method may further comprise utilizing or modifying an asset shared by the management server, and when the shared asset is modified, a modified asset may be generated based on at least one of a modification of the performance prop asset, a modification of the performance effect asset, or a modification of the performance environment asset. Additionally, protection information for the registered one or more assets and the modified asset may manage information on revision history based on a blockchain method.

A management server linked with a metaverse-based performance authoring system according to another aspect of the present disclosure may comprise a processor, a transceiver and a memory, and the processor may comprise one or more modules for registering and managing assets for performance authoring on a metaverse-based platform. The one or more modules are configured to: register one or more assets related to performance authoring on the metaverse-based platform; and sharing the registered one or more assets on the metaverse-based platform. The one or more assets may include at least one of a performance prop asset related to a prop of a performance, a performance effect asset related to special effects of a performance, or a performance environment asset related to an overall configuration of a performance.

Additionally, regarding the management server, the one or more modules may include a first module for managing user identification information on the metaverse-based platform, a second module for managing a registration procedure for sharing the one or more assets, and a third module for managing a utilization procedure for the one or more assets.

The features briefly summarized above with respect to the disclosure are merely exemplary aspects of the detailed description of the disclosure that follows, and do not limit the scope of the disclosure.

According to the present disclosure, A method and apparatus for efficiently producing performance contents using shared performance works linked with the metaverse platform may be provided.

According to the present disclosure, a method and apparatus for reporting and utilizing shared performance works provided on the metaverse may be provided.

According to the present disclosure, it has the advantage of reducing overlapping development by sharing necessary performance works on the metaverse and efficiently producing metaverse performance contents by recycling shared performance works.

Effects achievable by the present disclosure are not limited to the above-described effects, and other effects which are not described herein may be clearly understood by those skilled in the pertinent art from the following description.

BRIEF DESCRIPTION OF THE DRAWINGS

FIG. 4 illustrates a configuration diagram of a metaverse-based performance asset management server according to an embodiment of the present disclosure.

DETAILED DESCRIPTION

Figure 1:
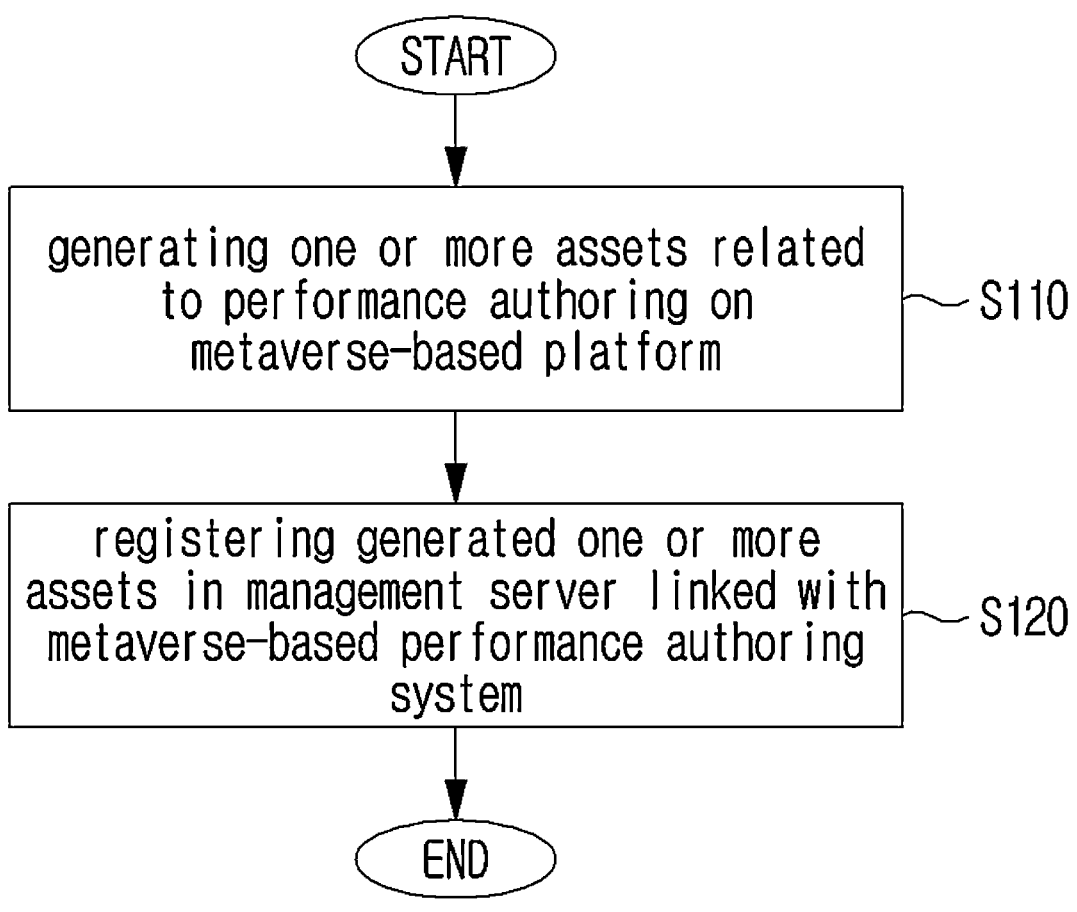
FIG. 1 illustrates an operational flowchart of a metaverse-based performance authoring system according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

The system and/or method/device (hereinafter simply referred to as 'system') proposed in this disclosure may correspond to a technology that may easily produce performance contents using a shared performance work (e.g., a shared performance authored/copyrighted work) linked with the metaverse platform. This may be related to the field of virtual reality performance authoring technology that works with the metaverse platform.

That is, the system proposed in the present disclosure may correspond to a method of registering/posting elements necessary for performance authoring as shared performance works on the metaverse to facilitate performance production. Content producers may easily produce their own performance contents by utilizing performance works posted on the metaverse.

In this case, unlike the conventional method of repeatedly developing and using elements necessary for authoring performance contents independently in a contents development environment, it has the advantage of reducing repetitive development of common elements, by sharing/utilizing performance elements that are frequently used in the metaverse environment.

In addition, the metaverse performance produced using the system proposed in this disclosure may be posted on the metaverse performance platform, and consumers may participate in and watch the desired metaverse performance. In this regard, the system proposed in the present disclosure may support work protection (e.g., copyright protection) and utilization methods for a work by presenting a protection method for shared performance works provided on the metaverse.

In addition, the system proposed in the present disclosure may belong to a virtual performance technology expressed in a virtual world, and may be utilized in a mixed/augmented reality performance technology based on XR technology in terms of authoring technology. In addition, it may be used for pre-visualization (pre-viz) technology, which is a pre-production technology that supports performances in the real world.

Hereinafter, in the present disclosure, the above-described performance work may be expressed as a performance asset, which may mean a performance-related asset that may be used/applied to a performance work on the metaverse. That is, in the system proposed by this disclosure, the unit of an object that is shared, utilized, and/or protected may be expressed as an asset. In this disclosure, "performance authoring" means the authoring of performance content.

In order to achieve the above object, the system and/or method/device proposed in this disclosure may be implemented based on the operation in FIG. 1.

FIG. 1 illustrates an operational flowchart of a metaverse-based performance authoring system according to an embodiment of the present disclosure.

Referring to FIG. 1, in step S110, the metaverse-based performance authoring system may be configured to generate one or more assets related to performance authoring on a metaverse-based platform.

Then, in step S120, the metaverse-based performance authoring system may be configured to register the generated one or more assets in a management server linked with the metaverse-based performance authoring system.

In relation to the above-described operations, an operation of accessing to the performance asset management server, an operation of determining whether a new asset is needed, and/or an operation of determining whether a desired asset exists in the performance asset management server may be performed.

For example, an asset producer/user may access to a performance asset management server and check whether a desired asset exists in the corresponding server. If a desired asset exists, the asset producer/user may download the corresponding asset. Alternatively, if the desired asset does not exist, the asset producer/user may generate a new asset, and for this purpose, asset generation (or asset modification) may be performed according to the above-described step S110. Additionally or alternatively, when a new asset is required, the asset producer/user may perform asset generation (or asset modification) according to the above-described step S110 without accessing the performance asset management server.

Additionally, in order to register the generated (or modified) asset, the asset producer/user may perform asset registration according to the above-described step S120, and if the asset registration is not desired, the asset registration may not be performed.

Additionally, regarding the above operations, the one or more assets may be shared on the metaverse-based platform and applied to the performance authoring. Additionally, the one or more assets may include at least one of the following assets. The following assets include performance prop assets related to objects, performance effect assets related to special effects, or performance environment assets related to an overall configuration used in a performance.

In this regard, the performance prop asset may be generated based on a first component for a geometric shape of an object, a second component for a material of an object, and a third component for a texture of an object. Additionally, the performance prop assets may be generated by applying one of pre-configured operation modes for the first component, one of a pre-configured second list of alternatives for the second component and one of a pre-configured third list of alternatives for the third component.

Here, the list of alternatives means items previously generated by a content producer so that the second component or the third component may be changed. For example, the second list of alternatives is a list of materials such as glass material, metal material, and so forth. The third list of alternatives means a list of textures that may be changed or added, such as a diffuse texture, a specular texture, a normal texture, and the like.

The performance effect asset may be generated by applying a specific performance effect according to a start or end event for a pre-configured performance effect and a pre-configured alternative property setting event.

The performance environment asset may be generated by applying a specific scenario according to a performance environment configuration for a pre-configured performance scenario and a pre-configured alternative scenario setting event. In here, the performance environment configuration may include a configuration of arranging an object corresponding to the performance prop asset and an object corresponding to the performance effect asset in a meta-verse-based specific performance venue.

Additionally, the one or more assets may be managed based on pre-configured protection information, and the pre-configured protection information may have asset identification information and author information as a basic configuration, and include asset property information or sharing range information. Asset identification information may be basically registered when registering as a shared asset, and if there is no author information, author information may be registered as registration user information. Asset sharing range information is information that a registrant registers when an asset is to be protected, and may not be open to everyone free of charge. If there is sharing range information, asset property information plays a role of a distinct protection target, and if there is no sharing range information, it may be seen as providing usage guide information for free assets.

Additionally or alternatively, the metaverse-based performance authoring system may be configured to use or modify assets shared by the management server. When the shared asset is modified, a modified asset may be generated based on at least one of the following methods. The following methods include modification of the performance prop assets, the performance effect assets, or the performance environment assets. In this case, protection information for the registered one or more assets and modified assets may manage information on revision history based on a block-chain method.

Referring to the contents of FIG. 1 described above, the present disclosure describes a specific method of generating/producing, sharing, and/or utilizing assets in relation to performance authoring on the metaverse platform.

Figure 2:
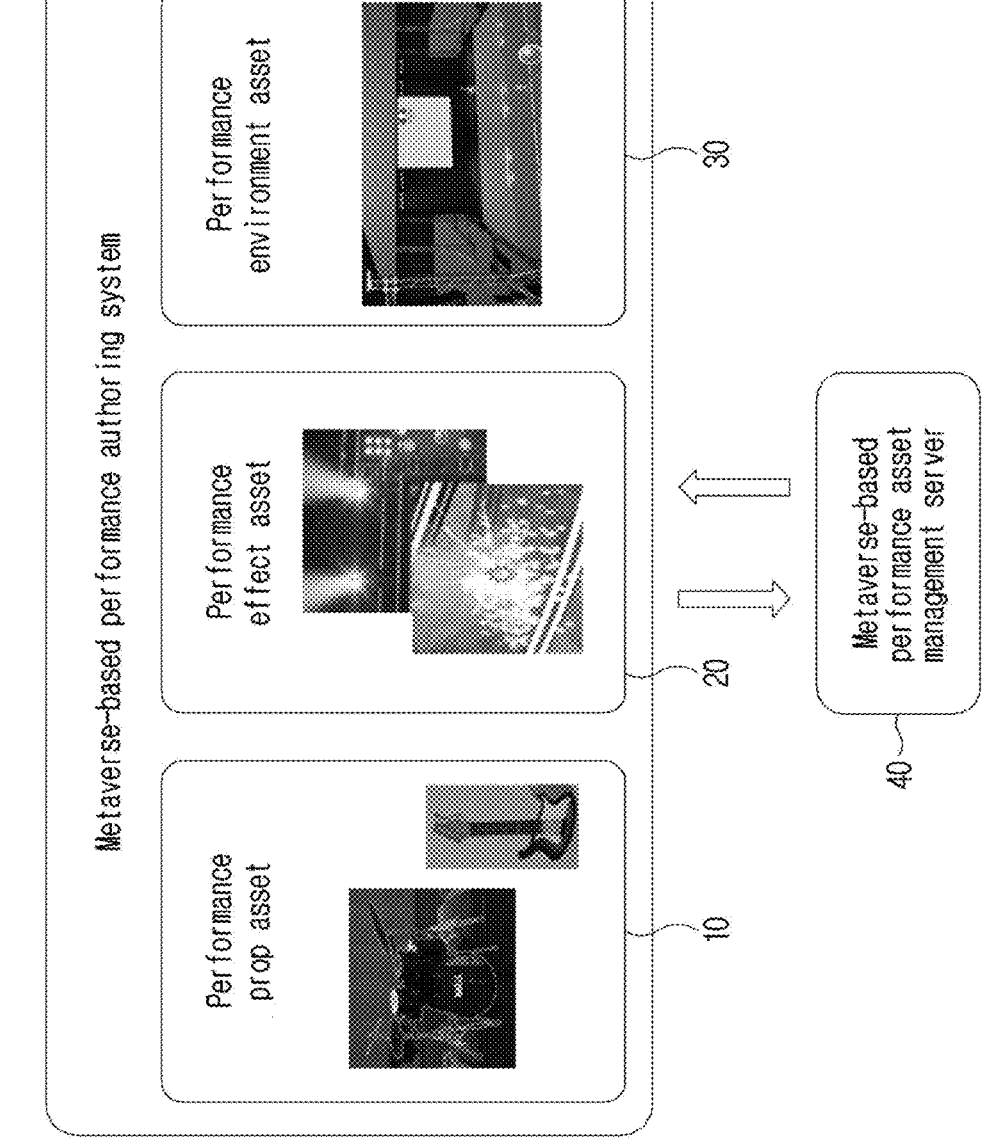
FIG. 2 illustrates an operation diagram of a metaverse-based performance authoring system according to an embodiment of the present disclosure.

FIG. 2 illustrates an operation diagram of a metaverse-based performance authoring system according to an embodiment of the present disclosure.

Referring to FIG. 2, in relation to the metaverse-based performance authoring system of the present disclosure, a performance asset may include a performance prop asset 10, a performance effect asset 20, and a performance environment asset 30.

That is, the metaverse-based performance authoring system in the present disclosure is composed of a performance prop asset 10, a performance effect asset 20, and a performance environment asset 30, and may provide systematically elements necessary for metaverse performance content production. Through this, a function and production method capable of easily producing metaverse performance contents desired by producers may be provided.

The performance prop asset 10 may correspond to an asset representing prop(s) required for configuration of performance content, such as instruments, lights, and chairs used in a performance. The performance prop asset 10 may be referred to as a shape object prop asset.

The performance effect asset 20 may correspond to an asset expressing a special effect and/or a lighting effect using particles such as fireworks expressing a performance effect. The performance effect asset 20 may be referred to as a performance effect object asset.

The performance environment asset 30 is related to a spatial element in which the above-described performance prop asset 10 and performance effect asset 20 may be placed, and may correspond to an asset that expresses a performance directing composition using the corresponding performance element(s). The performance environment asset 30 may also be referred to as a performance environment object asset.

In addition, the metaverse-based performance asset management server 40 may register and store data/information in association with the metaverse-based performance authoring system. For example, performance prop assets 10, performance effect assets 20, and performance environment assets 30 may be registered and stored in the metaverse-based performance asset management server 40.

Through this, the performance asset management server 40 may perform a function of providing registered data/information so that other users (e.g., asset users) may utilize the corresponding data/information.

In relation to the above-described metaverse-based performance authoring system, in the present disclosure, the performance prop asset 10, the performance effect asset 20, and the performance environment asset 30 will be described in detail.

Figure 3:
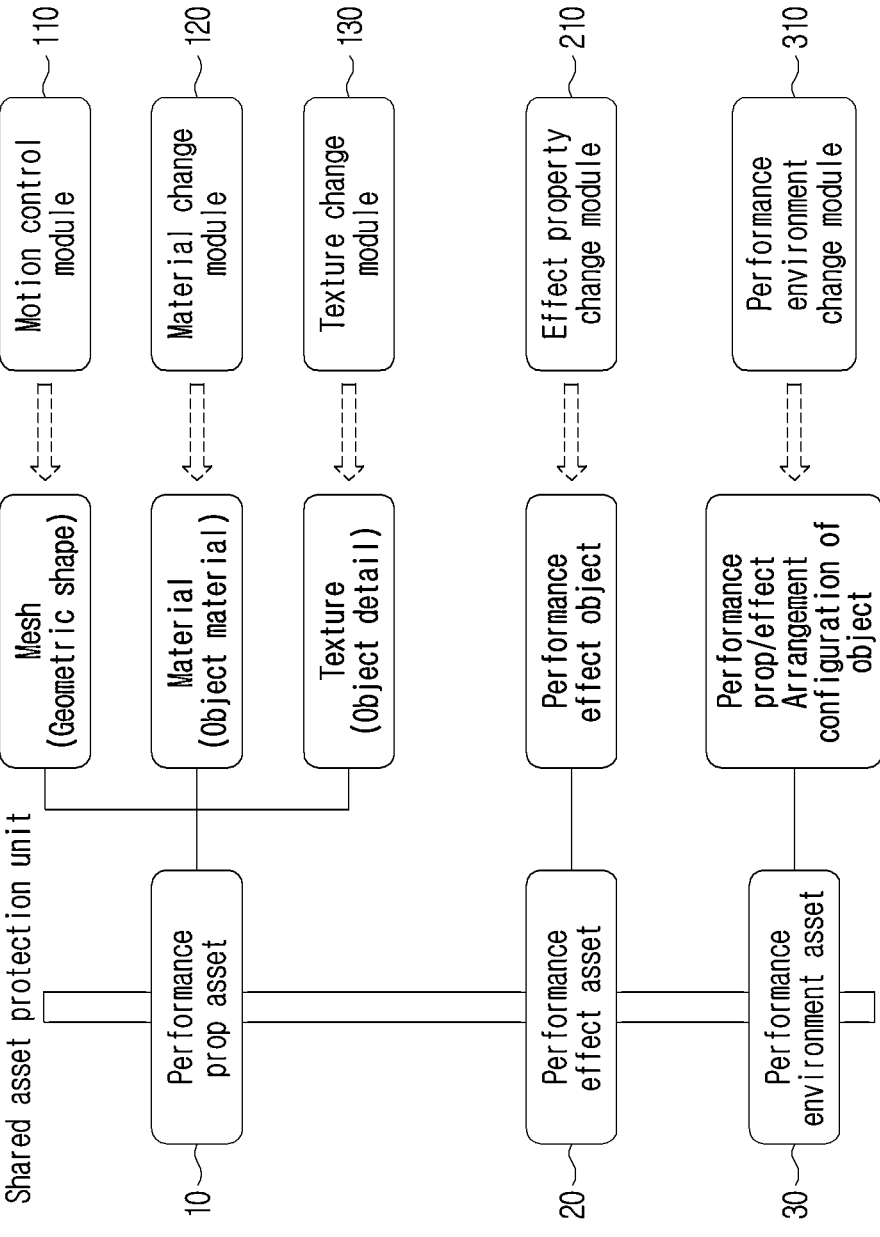
FIG. 3 illustrates a configuration diagram of a metaverse-based performance authoring system according to an embodiment of the present disclosure.
Figure 5A:
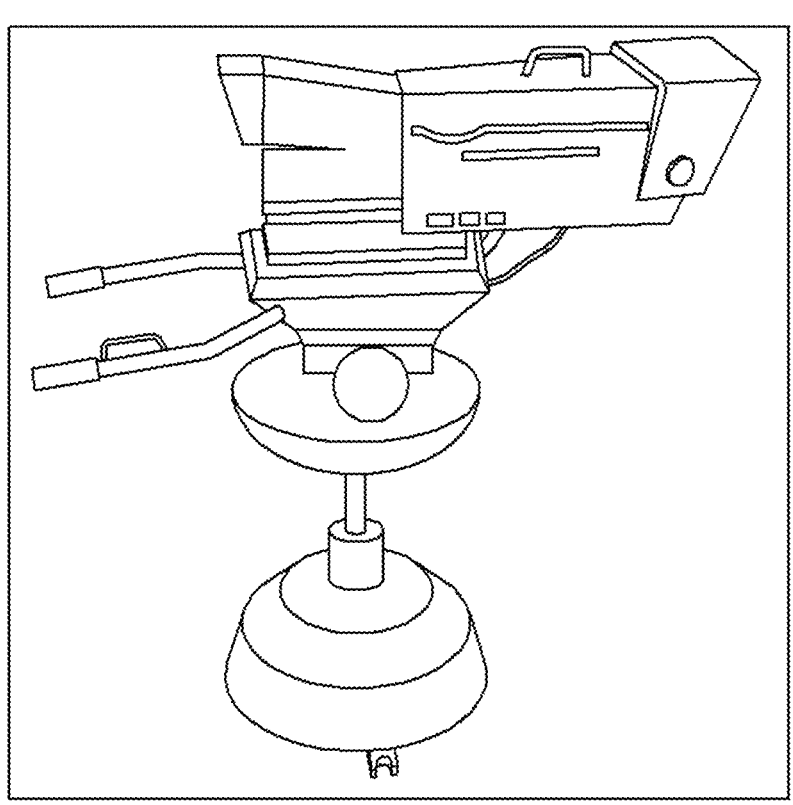
FIGS. 5A to 5D illustrates protection information for a shared asset according to an embodiment of the present disclosure.
Figure 5B:
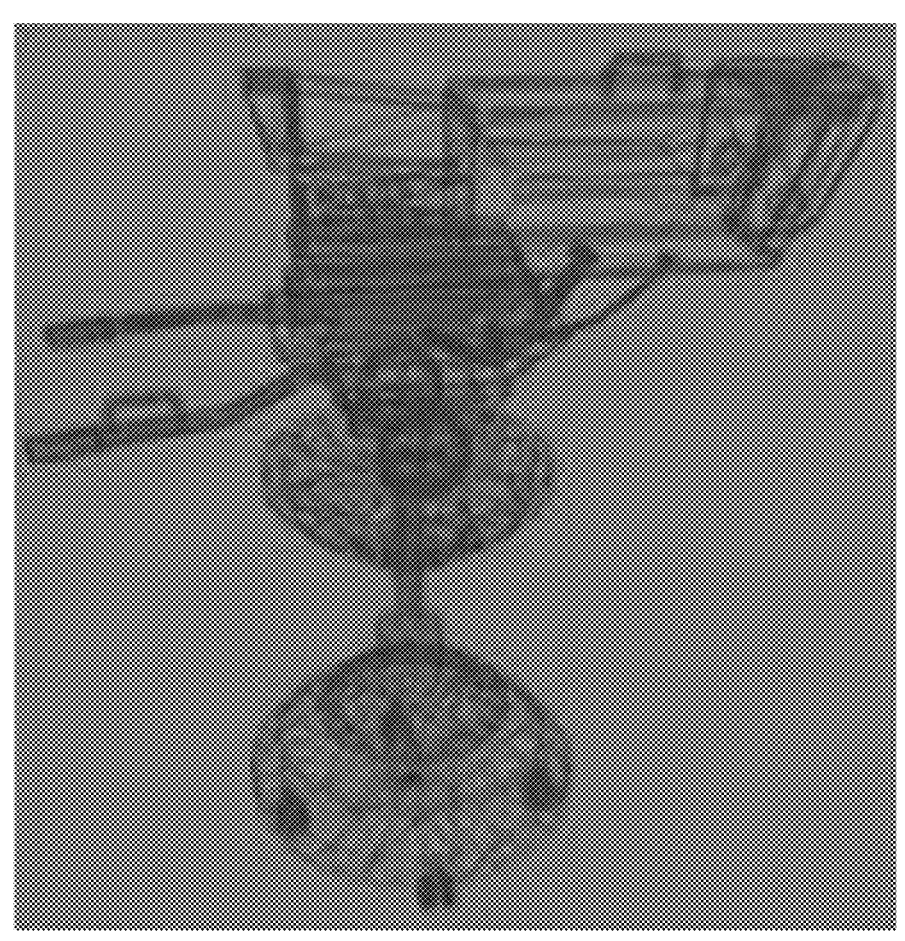
Figure 5C:
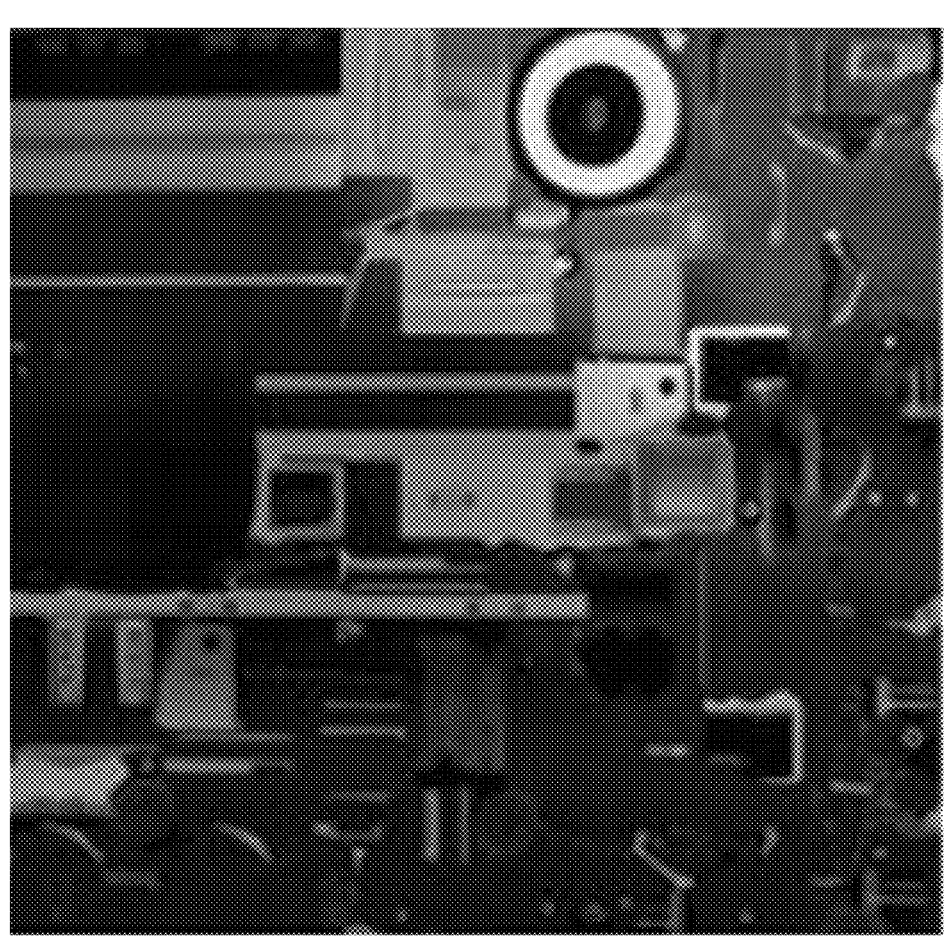
Figure 5D:
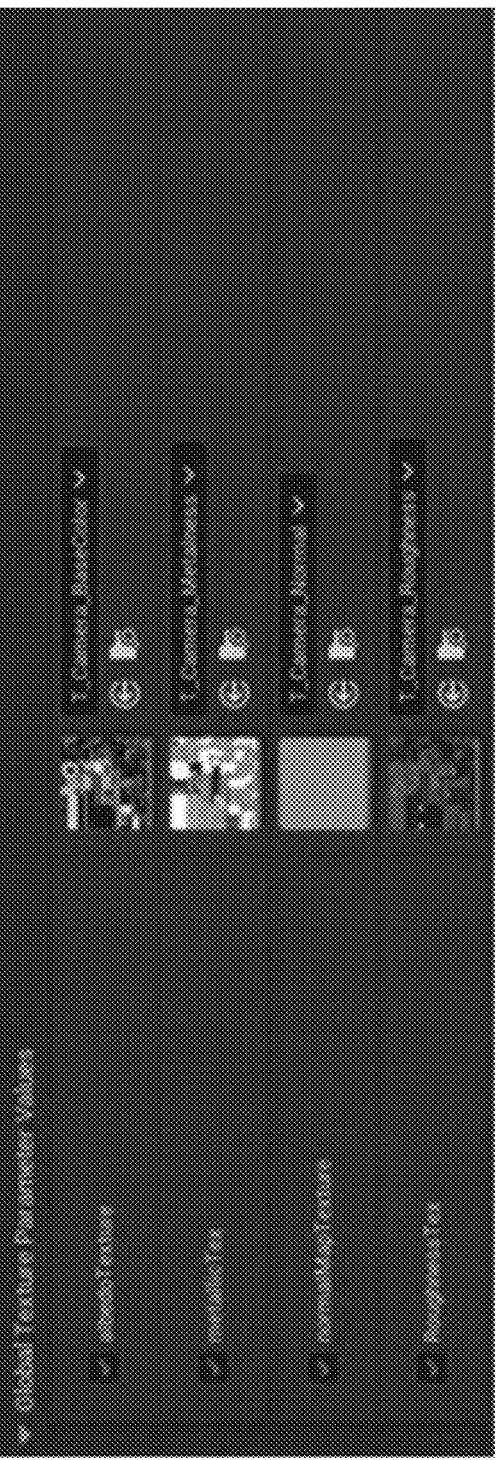

FIG. 3 illustrates a configuration diagram of a metaverse-based performance authoring system according to an embodiment of the present disclosure.

Referring to FIG. 3, the protection unit of a shared asset, that is, an asset shared for performance authoring on the metaverse, may be configured to a performance prop asset 10, a performance effect asset 20, and a performance environment asset 30.

That is, with reference to the description in FIG. 2, a performance prop asset 10 representing a visible form, a performance effect asset 20 representing a performance effect such as lighting or special effects, and a performance environment asset 30 related to the composition of a performance venue may be configured as a shared asset protection unit in the system and/or method/device proposed in this disclosure. In addition, objects for players or performers may be added.

The performance prop asset 10 may be composed of a mesh representing a geometric shape, an object material representing the sparkle/color of an object, and a texture that is a detailed representation of the object. Through this, the performance prop asset 10 may represent elements constituting a virtual performance, such as musical instruments, speakers, microphones, and cameras.

In addition, each asset constituting the performance prop asset 10 may be configured to operate in a mutual way by changing the above-described elements or to look different from each other.

For example, the performance prop asset 10 may be configured based on the control of the motion control module 110, the material change module 120, and the texture change module 130.

The motion control module 110 may control to determine whether an object is in motion according to a start/end event for the motion. In addition, the motion control module 110 may control to express object motions such as left/right, up/down, front/back, etc. according to a motion event. Also, the motion control module 110 may control to express rotational motion of an object according to a motion rotation event.

The material change module 120 may manage a list of materials that may be replaced through a registration procedure and a deletion procedure for alternative materials. Based on the corresponding alternative material list, the material change module 120 may control to apply an alternative material to the shape object according to an alternative material setting event.

Additionally or alternatively, the material change module 120 may control to determine an alternative material and apply it to the shape object, regardless of the above-mentioned alternative material list.

The texture change module 130 may manage a alternative texture list through a procedure for registering and deleting alternative textures. Based on the corresponding alternative texture list, the texture change module 130 may control to apply an alternative texture to the shape object according to an alternative texture setting event. Through this, expressions of various detailed shape effects may be supported in the process of producing performance contents based on the metaverse.

Additionally or alternatively, the texture change module 130 may determine an alternative texture and apply it to the shape object, regardless of the above-mentioned alternative texture list.

The performance effect asset 20 may correspond to an asset that expresses a change in the direction, intensity, and/or color of lighting and a special effect such as expression of flame, smoke, and/or fog in relation to a performance effect.

For example, the performance effect asset 20 may be configured based on the control of the effect property change module 210.

The effect property change module 210 may control the start/end of the performance effect according to the start/end event of the performance effect set in the venue. In addition, the effect property change module 210 may manage a list of alternative properties, and may control to apply an alternative property according to an alternative property setting event based on the list of alternative properties. Through this, expressions of various performance effects may be supported in the process of producing performance contents based on the metaverse.

The performance environment asset 30 may correspond to an asset constituting a performance environment through arrangement of performance props/effect objects based on a performance scenario.

For example, the performance environment asset 30 may be configured based on the control of the performance environment change module 310.

The performance environment change module 310 may configure a performance environment based on a performance scenario and control start/end of a set performance scenario (scenario) according to a start/end event of the scenario. Also, the performance environment change module 310 may manage a list of alternative scenarios, and may control to apply an alternative scenario according to an alternative scenario setting event based on the corresponding alternative scenario list. Through this, in the process of producing performance contents based on the metaverse, a scenario suitable/optimal for the situation may be provided.

At least one of the motion control module 110, material change module 120, texture change module 130, effect property change module 210 or performance environment change module 310 described in FIG. 3 may be included/implemented in the metaverse-based performance authoring system according to the situation and/or setting, etc.

That is, the modules described in FIG. 3 may not necessarily all be included in the metaverse-based performance authoring system, and the module may be provided/included when a change to the corresponding object/asset is required.

Figure 4:
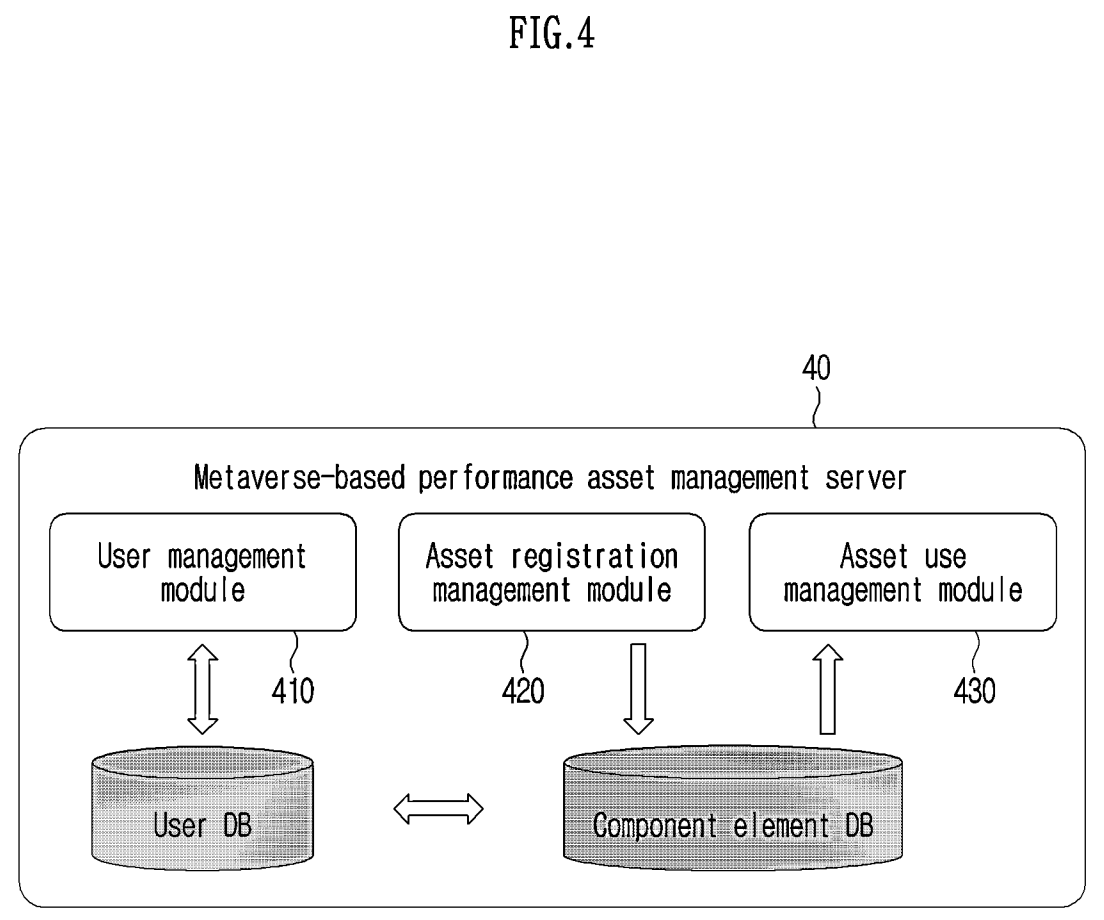

FIG. 4 illustrates a configuration diagram of a metaverse-based performance asset management server according to an embodiment of the present disclosure.

Referring to FIG. 4, the metaverse-based performance asset management server 40 may correspond to a server that manages one or more assets used for authoring a metaverse performance on a metaverse performance platform.

The metaverse-based performance asset management server 40 may include a user management module 410, an asset registration management module 420, and an asset use management module 430. If the scale of management/use is small, management/processing of assets may be performed by integrally implementing each management module.

The user management module 310 is a module that performs an operation of registering and/or deleting users in the metaverse performance platform.

In terms of the metaverse performance authoring system, the user management module 310 may manage a shared asset provider or a shared asset user in conjunction with a user DB. If the number of users is small, user management may be performed in the form of data files without a DB system.

The asset registration management module 420 is a module that requests necessary information related to a shared asset from a shared asset registrant and records and stores the shared asset in a corresponding server. In the present disclosure, a shared asset may refer to an asset that is shared by registering an asset provider or the like in a server.

When a suitable/high performance determination method for similar shared assets is provided, the asset registration management module 420 may perform recording and storage procedures by minimizing duplicate registration of shared assets.

The asset use management module 430 ia a module that performs posting information about shared assets to the metaverse platform, and recording and managing information about users who have downloaded shared assets from the server and information on the shared assets.

In this regard, the asset use management module 430 may manage/control an operation of charging users according to a charge policy for a shared asset.

Additionally, mutual information access is possible between each DB. For example, the asset registration management module 420 may perform basic history management using a pair of user information registering an asset and asset registration information. For another example, the asset use management module 430 may access user information when it is necessary to distribute a use profit for an asset.

FIGS. 5A to 5D illustrates protection information for a shared asset according to an embodiment of the present disclosure.

Referring to FIG. 5, in relation to the metaverse-based performance authoring system proposed in the present disclosure, the metaverse-based performance asset management server 40 may manage a shared asset by setting protection information for the corresponding shared asset.

The protection information for the shared asset may include a shared asset ID, author information (e.g., user ID), asset information, and sharing/usage range information, and other information may be added if necessary.

A shared asset ID means a unique value/information about an asset shared on the metaverse platform, and assets may be distinguished as the corresponding shared asset ID is provided.

Author information may be configured/applied based on information managed by the user management module 410 of the metaverse-based performance asset management server 40 described above.

Asset itself information may be information configured to distinguish assets, and may be referred to as asset property information. For example, the asset information itself includes a 3D shape image in FIG. 5A, a 3D wireframe image in FIG. 5B, a texture image in FIG. 5C, and material setting information in FIG. 5D.

In this regard, a 3D shape image and/or a 3D wireframe image may be an important element for confirming the shape of an object and may be a necessary element to avoid overlapping registration.

In addition, the sharing/usage range information may be provided including license information about whether the provided shared asset may be used free of charge and/or whether a fee is charged.

If a sharing/use range for a corresponding asset is set free of charge, protection information for the above-described shared asset may be configured and operated while being minimized.

Figure 6:
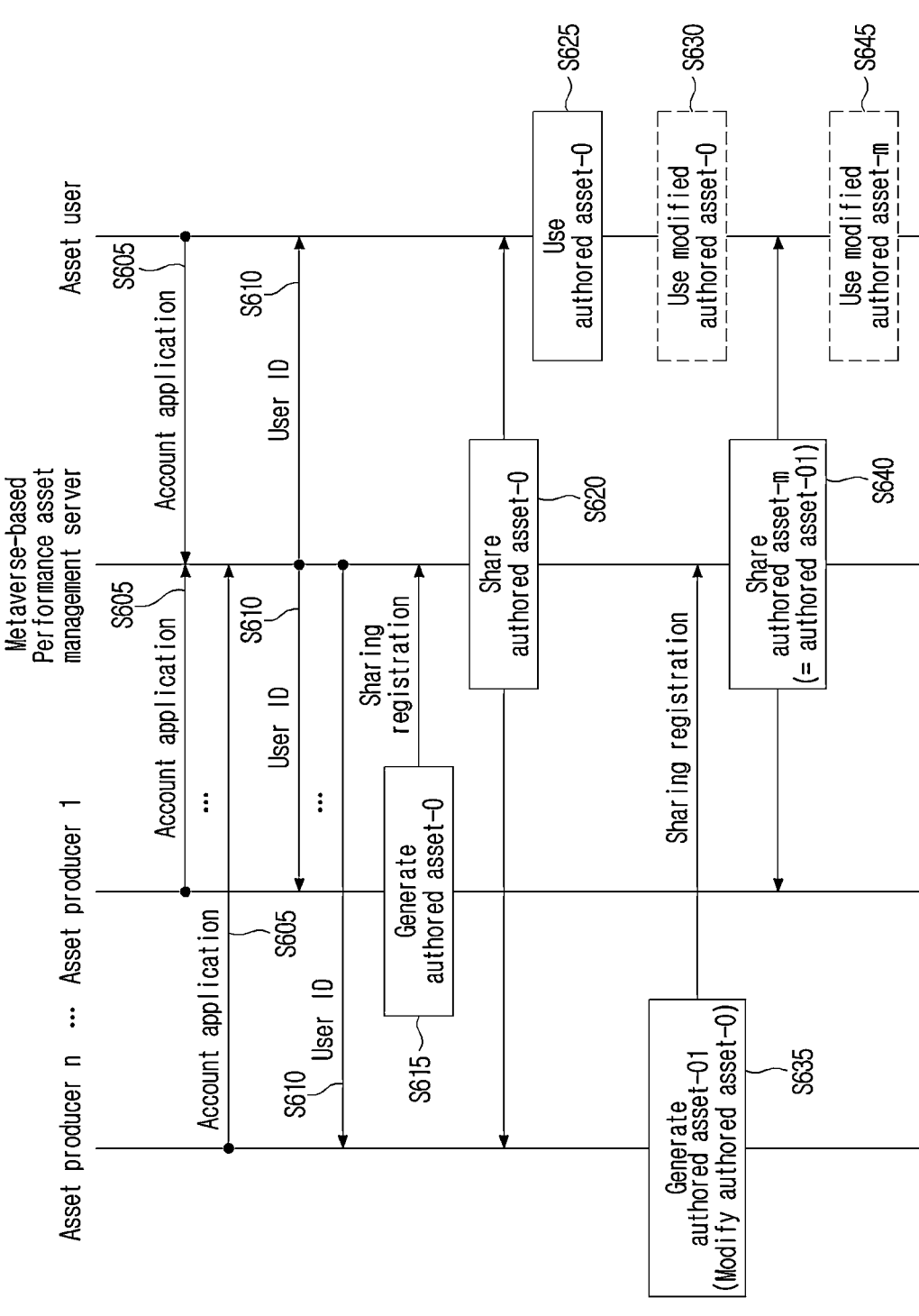
FIG. 6 illustrates an information processing flow chart in a metaverse-based performance authoring system according to an embodiment of the present disclosure.

FIG. 6 illustrates an information processing flow chart in a metaverse-based performance authoring system according to an embodiment of the present disclosure.

Referring to FIG. 6, the metaverse-based performance asset management server 40 supports a shared asset registration function to one or more asset producers (e.g., asset producer 1 to asset producer n), and assets registered to asset users function may be supported. An asset producer and an asset user are names on a role, and may be the same person as a producer when an asset is registered and a user when an asset is used.

One or more asset producers and asset users may request an account application from the metaverse-based performance asset management server 40 in order to register and/or use assets to be used for producing metaverse-based performance contents (S605).

Based on the corresponding account request, the metaverse-based performance asset management server 40 may deliver the user ID to each asset producer and asset user (S610).

That is, the metaverse-based performance asset management server 40 performs user registration using the user management module 410, and may distinguish users of the corresponding metaverse platform through the corresponding user registration. Here, a user may mean one or more asset producers and asset users using the metaverse platform.

An asset producer may generate and share and register an authored asset-0 (for convenience, 0 as a registered asset name, not an order) based on the metaverse-based performance authoring system described above in this disclosure (S615).

As an example, asset producer 1 may generate an authored asset-1 (a classification name for convenience) including at least one of the performance prop asset 10, the performance effect asset 20, or the performance environment asset 30 described above in this disclosure. Thereafter, asset producer 1 may register the corresponding asset in the metaverse-based performance asset management server 40 to share the generated authored asset-0.

After generating and sharing registration of the above-described asset-0, the metaverse-based performance asset management server 40 may share the asset-0 to other asset producers and/or asset users (S620). In this case, the corresponding authored asset-0 may be shared and managed based on the protection information described above in FIGS. 5A to 5D.

The asset user may access and use information about the shared authored asset-0 (S625).

In addition, the corresponding asset user may partially modify and use the authored asset-0 (S630). For example, an asset user may modify a shared asset by using/applying a module related to change to the asset.

In addition, the corresponding asset user may partially modify and use the authored asset-0 (S630). For example, an asset user may modify a shared asset by using/applying a module related to change to the asset.

At least one may be used/applied among the motion control module 110, material change module 120, texture change module 130, effect property change module 210, or performance environment change module 310 described above in FIG. 3.

In addition, in relation to generation and registration of assets, a method of managing the history (i.e., modification history) of shared assets by utilizing blockchain technology may also be applied.

An asset producer may modify an authored asset generated and shared by another asset producer to generate and register a new authored asset.

For example, asset producer n modifies the shared authored asset-0 through steps S615 and S620, and the authored asset-01 (example of displaying modification history information, 0 is the previous value, 1 is the current value) may be generated and shared and registered (S635). At this time, the asset producer n may modify the authored asset-0 by using/applying at least one of the aforementioned motion control module 110, material change module 120, texture change module 130, effect property change module 210, or performance environment change module 310, and the modified result may be generated/saved/recorded as storage asset-m (including authored asset-01: history record) based on the blockchain method.

Similar to step S620, after generation and sharing registration of the above-described authored asset-01, the authored asset-m may be shared to other asset producers and/or asset users by the metaverse-based performance asset management server 40 (S640).

In this case, the corresponding authored asset-01 may be shared and managed based on the protection information described above in FIGS. 5A to 5D. At this time, the protection information for the corresponding authored asset-01 may include information on modification history.

Similar to steps S625 and S630, the asset user may access and use information on the shared authored asset-m, and may partially modify and use the authored asset-m (S630).

For example, an asset user may modify the shared asset by using/applying at least one of the motion control module 110, material change module 120, texture change module 130, effect property change module 210, or performance environment change module 310 described above with reference to FIG. 3.

The above-described method for registering and using sharing of an asset in FIG. 6 may be a method in which utilization of protection information for a shared asset in FIGS. 5A to 5D is considered. However, when the sharing/use range is established free of charge, the protection information rules for shared assets in FIGS. 5A to 5D may not be followed.

In addition, asset users and asset producers may not generally need to be distinguished, but FIG. 6 is limited to asset users who do not register shared assets as an example.

As shown in FIG. 6, the asset user may use the shared asset obtained from the metaverse-based performance asset management server 40 without modification or after modifying it. In this way, asset users can utilize shared assets in various ways to produce metaverse-based performance contents.

In addition, it goes without saying that matters related to the operations and assets in FIG. 6 described above may be embodied based on the contents described above in the present disclosure.

Figure 7:
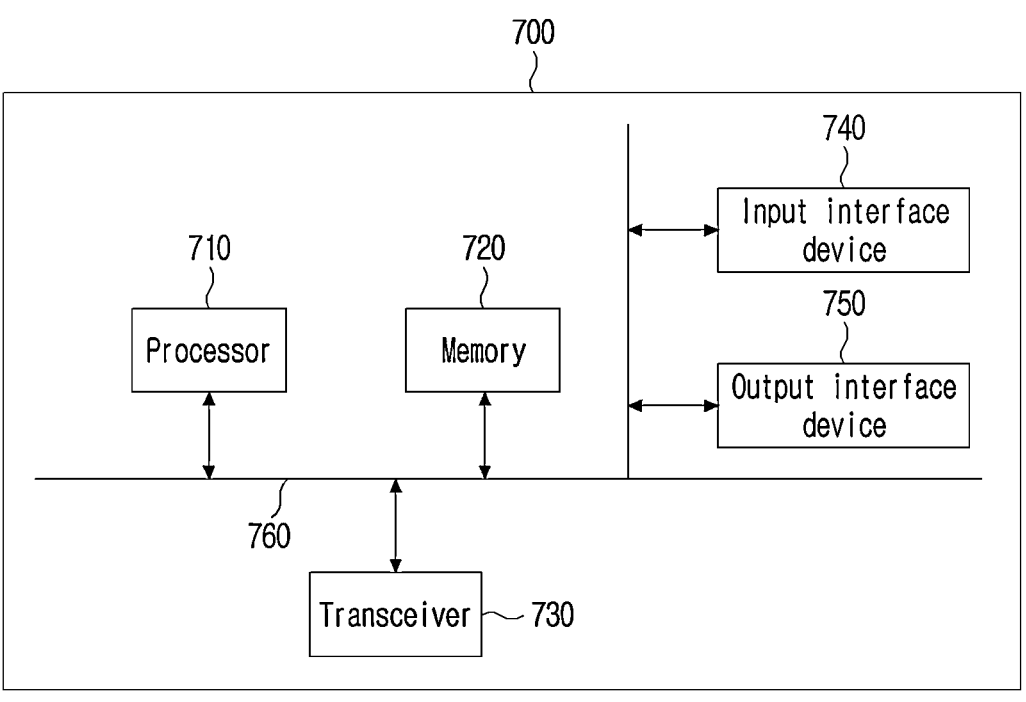
FIG. 7 is a block diagram illustrating an apparatus according to an embodiment of the present disclosure.

FIG. 7 is a block diagram illustrating an apparatus according to an embodiment of the present disclosure.

Referring to FIG. 7, a device 700 may represent a device in which the metaverse-based performance writing system described in this disclosure is implemented.

For example, the device 700 may support/control a function of generating, sharing, registering, and modifying performance prop assets 10, performance effect assets 20, and performance environment assets 30 in the above-described metaverse-based performance authoring system.

Additionally or alternatively, the device 700 may represent a device in which the metaverse-based performance asset management server 40 is implemented.

For example, the device 700 may support/control a user registration function, an asset registration function, and/or an asset use function in relation to the above-described metaverse-based performance authoring system.

The device 700 may include at least one of a processor 710, a memory 720, a transceiver 730, an input interface device 740, and an output interface device 750. Each of the components may be connected by a common bus 760 to communicate with each other. In addition, each of the components may be connected through a separate interface or a separate bus centering on the processor 710 instead of the common bus 460.

The processor 710 may be implemented in various types such as an application processor (AP), a central processing unit (CPU), a graphic processing unit (GPU), etc., and may be any semiconductor device that executes a command stored in the memory 720. The processor 710 may execute a program command stored in the memory 720. The processor 410 may be configured to implement the metaverse-based performance authoring system and/or method/apparatus described based on FIGS. 1 to 6 described above.

For example, the processor 710 includes a motion control module 110, a material change module 120, a texture change module 130, and an effect property change module 210 and/or a performance environment change module 310 for generating and modifying assets related to the metaverse-based performances. Additionally or alternatively, the processor 710 may include a user management module 410, an asset registration management module 420 and/or an asset use management module 430.

And/or, the processor 710 may store a program command for implementing at least one function for the corresponding modules in the memory 720 and may control the operation described based on FIGS. 1 to 6 to be performed.

The memory 720 may include various types of volatile or non-volatile storage media. For example, the memory 720 may include read-only memory (ROM) and random access memory (RAM). In an embodiment of the present disclosure, the memory 720 may be located inside or outside the processor 710, and the memory 720 may be connected to the processor 710 through various known means.

For example, memory 720 may be used to store performance authoring data.

The transceiver 730 may perform a function of transmitting and receiving data processed/to be processed by the processor 710 with an external device and/or an external system.

For example, the transceiver 730 may be utilized for data exchange with the metaverse platform.

The input interface device 740 is configured to provide data to the processor 710.

The output interface device 750 is configured to output data from the processor 710.

In the case of the metaverse-based performance authoring system and/or method/apparatus in the present disclosure, there are advantages to support reducing redundant development producers may focus on producing performance contents, by sharing necessary performance elements, that is, performance assets, on the metaverse platform. That is, based on the metaverse-based performance authoring system and/or method/apparatus of the present disclosure, there is an advantage in that performance contents may be efficiently produced using shared performance assets/works linked to the metaverse platform.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. An apparatus for a metaverse-based performance authoring system, the apparatus comprising:

a processor, a transceiver and a memory, wherein the processor comprises one or more modules for performance authoring on a metaverse-based platform, wherein the one or more modules are configured to:

generate one or more assets related to performance authoring on a metaverse-based platform; and register the generated one or more assets in a management server linked with the metaverse-based performance authoring system, wherein the one or more assets are shared on the metaverse-based platform and applied to the performance authoring, and wherein the one or more assets include at least one of a performance prop asset related to a prop of a performance, a performance effect asset related to special effects of a performance, or a performance environment asset related to an overall configuration of a performance.

2. The apparatus of claim 1, wherein the performance prop asset is generated based on a first component for a geometric shape of an object, a second component for a material of an object, and a third component for a texture of an object.

3. The apparatus of claim 2, wherein the performance prop asset is generated by applying one of pre-configured operation modes for the first component, one of a pre-configured second list of alternatives for the second component and one of a pre-configured third list of alternatives for the third component.

4. The apparatus of claim 1, wherein the performance effect asset is generated by applying a specific performance effect according to a start or end event for a pre-configured performance effect and a pre-configured alternative property setting event.

5. The apparatus of claim 1, wherein the performance environment asset is generated by applying a specific scenario according to a performance environment configuration for a pre-configured performance scenario and a pre-configured alternative scenario setting event.

6. The apparatus of claim 5, wherein the performance environment configuration includes a configuration of arranging an object corresponding to the performance prop asset and an object corresponding to the performance effect asset in a metaverse-based specific performance venue.

7. The apparatus of claim 1, wherein the one or more assets are managed based on pre-configured protection information, and wherein the pre-configured protection information has asset identification information and author information as a basic configuration, and includes asset property information or sharing range information.

8. The apparatus of claim 1, wherein the one or more modules are configured to utilize or modify an asset shared by the management server, and wherein, when the shared asset is modified, a modified asset is generated based on at least one of a modification of the performance prop asset, a modification of the performance effect asset, or a modification of the performance environment asset.

9. The apparatus of claim 8, wherein protection information for the registered one or more assets and the modified asset manages information on revision history based on a blockchain method.

10. A management server linked with a metaverse-based performance authoring system, the management server comprising:

a processor, a transceiver and a memory, wherein the processor comprises one or more modules for registering and managing assets for performance authoring on a metaverse-based platform, wherein the one or more modules are configured to:

register one or more assets related to performance authoring on the metaverse-based platform; and sharing the registered one or more assets on the metaverse-based platform, wherein the one or more assets include at least one of a performance prop asset related to a prop of a performance, a performance effect asset related to special effects of a performance, or a performance environment asset related to an overall configuration of a performance.

11. The management server of claim 10, wherein the one or more modules include a first module for managing user identification information on the metaverse-based platform, a second module for managing a registration procedure for sharing the one or more assets, and a third module for managing a utilization procedure for the one or more assets.

12. A method performed by a metaverse-based performance authoring system, the method comprising:

generating one or more assets related to performance authoring on a metaverse-based platform; and registering the generated one or more assets in a management server linked with the metaverse-based performance authoring system, wherein the one or more assets are shared on the metaverse-based platform and applied to the performance authoring, and wherein the one or more assets include at least one of a performance prop asset related to a prop of a performance, a performance effect asset related to special effects of a performance, or a performance environment asset related to an overall configuration of a performance.

13. The method of claim 12, wherein the performance prop asset is generated based on a first component for a geometric shape of an object, a second component for a material of an object, and a third component for a texture of an object.

14. The method of claim 13, wherein the performance prop asset is generated by applying one of pre-configured operation modes for the first component, one of a pre-configured second list of alternatives for the second component and one of a pre-configured third list of alternatives for the third component.

15. The method of claim 12, wherein the performance effect asset is generated by applying a specific performance effect according to a start or end event for a pre-configured performance effect and a pre-configured alternative property setting event.

16. The method of claim 12, wherein the performance environment asset is generated by applying a specific scenario according to a performance environment configuration for a pre-configured performance scenario and a pre-configured alternative scenario setting event.

17. The method of claim 16, wherein the performance environment configuration includes a configuration of arranging an object corresponding to the performance prop asset and an object corresponding to the performance effect asset in a metaverse-based specific performance venue.

18. The method of claim 12, wherein the one or more assets are managed based on pre-configured protection information, and wherein the pre-configured protection information has asset identification information and author information as a basic configuration, and includes asset property information or sharing range information.

19. The method of claim 12, further comprising:

utilizing or modifying an asset shared by the management server, wherein, when the shared asset is modified, a modified asset is generated based on at least one of a modification of the performance prop asset, a modification of the performance effect asset, or a modification of the performance environment asset.

20. The method of claim 19, wherein protection information for the registered one or more assets and the modified asset manages information on revision history based on a blockchain method.

\* \* \* \* \*